US010321492B2

(12) United States Patent
Akisada et al.

(10) Patent No.: US 10,321,492 B2
(45) Date of Patent: Jun. 11, 2019

(54) WIRELESS COMMUNICATION APPARATUS AND WIRELESS COMMUNICATION SYSTEM

(75) Inventors: Yukiyo Akisada, Musashino (JP);
Kazunori Miyazawa, Musashino (JP);
Yasuki Sakurai, Musashino (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 485 days.

(21) Appl. No.: 14/241,516

(22) PCT Filed: Aug. 30, 2012

(86) PCT No.: PCT/JP2012/072073
§ 371 (c)(1),
(2), (4) Date: Feb. 27, 2014

(87) PCT Pub. No.: WO2013/038922
PCT Pub. Date: Mar. 21, 2013

(65) Prior Publication Data
US 2014/0192766 A1 Jul. 10, 2014

(30) Foreign Application Priority Data

Sep. 14, 2011 (JP) .................................. 2011-200494
Jul. 17, 2012 (JP) .................................. 2012-158983

(51) Int. Cl.
*H04W 76/11* (2018.01)
*H04W 12/02* (2009.01)
(Continued)

(52) U.S. Cl.
CPC ............. *H04W 76/11* (2018.02); *H04L 63/06* (2013.01); *H04W 12/02* (2013.01); *H04W 12/04* (2013.01); *H04W 24/02* (2013.01); *H04W 12/10* (2013.01)

(58) Field of Classification Search
USPC ......................................................... 370/329
See application file for complete search history.

(56) References Cited

U.S. PATENT DOCUMENTS 8,442,071 B2 * 5/2013 Ishii ....................... H04B 7/155
370/235
2009/0054033 A1 * 2/2009 Pratt, Jr. ................ G01D 21/00
455/410

(Continued)

FOREIGN PATENT DOCUMENTS

JP    2007208439 A    8/2007

OTHER PUBLICATIONS

ISA-100.11a-2009 "Wireless systems for industrial automation: Process control and related applications" pp. 666-693, pp. 306-310, pp. 170-184.

(Continued)

*Primary Examiner* — Gregory B Sefcheck
*Assistant Examiner* — Majid Esmaeilian
(74) *Attorney, Agent, or Firm* — Sughrue Mion, PLLC

(57) ABSTRACT

A wireless communication apparatus for performing wireless communication between wireless devices via a wireless communication network, wherein the wireless communication apparatus comprises: a packet processor for generating a first packet including first control information and discrimination information for discriminating between the first control information for connecting to the wireless communication network a set wireless device, which is a wireless device for which the setting of instrument information required for accessing the wireless communication network has been performed, and second control information for connecting to the wireless communication network a setting-required wireless device, which is a wireless device for which there is a need to set instrument information, and a second packet including the discrimination information and (Continued)

the second control information; and a wireless communication unit for transmitting the first packet and the second packet generated by the packet processor to the wireless communication network.

15 Claims, 7 Drawing Sheets

(51) Int. Cl.
*H04W 24/02* (2009.01)
*H04W 12/04* (2009.01)
*H04L 29/06* (2006.01)
*H04W 12/10* (2009.01)

(56) References Cited

U.S. PATENT DOCUMENTS

| | | | |
|---|---|---|---|
| 2009/0316628 A1* | 12/2009 | Enns | H04L 12/40006 370/328 |
| 2010/0115278 A1* | 5/2010 | Shen | H04L 9/0844 713/171 |
| 2010/0306538 A1 | 12/2010 | Thomas et al. | |
| 2011/0055558 A1* | 3/2011 | Liu | H04L 9/0637 713/160 |
| 2011/0158127 A1* | 6/2011 | Duo | H04W 48/16 370/254 |
| 2011/0187490 A1* | 8/2011 | Nakamoto | G05B 19/418 340/3.9 |
| 2012/0002605 A1* | 1/2012 | Yoshino | H04W 52/0229 370/328 |
| 2012/0036568 A1* | 2/2012 | Kodama | G05B 19/0423 726/7 |

OTHER PUBLICATIONS

International Search Report for PCT/JP2012/072073 dated Oct. 2, 2012.

* cited by examiner

FIG. 5

| WIRELESS COMMUNICATION RESOURCE | ENCRYPTION KEY |
|---|---|
| Q11 | ENCRYPTION KEY K1 |
| Q12 | ENCRYPTION KEY K1 |
| Q21 | ENCRYPTION KEY K2 |
| Q22 | ENCRYPTION KEY K2 |
| ⋮ | ⋮ |

FIG. 6

| EUI64 ADDRESS | ENCRYPTION KEY |
|---|---|
| XX:XX:XX:XX:XX:XX:XX:XX (WIRELESS ACCESS POINT APPARATUS 13) | ENCRYPTION KEY K1 |
| YY:YY:YY:YY:YY:YY:YY:YY (WIRELESS DEVICE 11a) | ENCRYPTION KEY K1 |
| ZZ:ZZ:ZZ:ZZ:ZZ:ZZ:ZZ:ZZ (WIRELESS DEVICE 11b) | ENCRYPTION KEY K2 |
| ⋮ | ⋮ |

| DL ADDRESS | ENCRYPTION KEY |
|---|---|
| 0x0001~0x7FFF | ENCRYPTION KEY K1 |
| 0x8000~0xFFFF | ENCRYPTION KEY K2 |

| EUI64 ADDRESS | ENCRYPTION KEY |
|---|---|
| XX:XX:XX:XX:XX:XX:XX:XX (WIRELESS ACCESS POINT APPARATUS 13) | ENCRYPTION KEY K1 |
| YY:YY:YY:YY:YY:YY:YY:YY (WIRELESS DEVICE 11a) | ENCRYPTION KEY K1 |
| ZZ:ZZ:ZZ:ZZ:ZZ:ZZ:ZZ:ZZ (WIRELESS DEVICE 11b) | ENCRYPTION KEY K3 |
| ⋮ | ⋮ |

WIRELESS COMMUNICATION APPARATUS AND WIRELESS COMMUNICATION SYSTEM

TECHNICAL FIELD

The present invention relates to a wireless communication apparatus and a wireless communication system.

Priority is claimed on Japanese Patent Application No. 2011-200494, filed on Sep. 14, 2011 and Japanese Patent Application No. 2012-158983, filed on Jul. 17, 2012, the contents of which are incorporated herein by reference.

BACKGROUND ART

In recent years, in plant, factories, or the like, wireless communication systems have been implemented in which measuring instruments, actuators, which are capable of wireless communication and known as wireless field devices, are installed on-site, and control signals for controlling the wireless field devices and measurement signals obtained by the wireless field devices are communicated via a wireless communication network. An example of a communication standard used in such wireless communication systems is the ISA 100.11a, which is an industrial automation wireless communication standard established by the ISA (International Society of Automation).

In this case, in order to enable a wireless device such as the above-noted wireless field device to join a wireless communication network, it is necessary to perform a task known as provisioning, which sets device information with respect to the wireless device. Device information includes such things as network parameters and security parameters. Methods of provisioning can be generally divided into over-the-air (OTA) provisioning, in which wireless communication conforming to the above-noted ISA 100.11a wireless communication standard is done to set device information, and out-of-band (OOB) provisioning, in which communication by a communication means other than this wireless communication (for example, infrared communication) is done to set device information.

Non-Patent Document 1 noted below sets forth a number of methods of performing the above-noted OTA provisioning. An example is the setting forth of a method in which a wireless communication network managed by a wireless communication system is divided into a number of wireless subnetworks, with a provisioning network, which is a wireless subnetwork dedicated for use in provisioning being logically separated on a target network that is a wireless subnetwork for operation, whereby device information is set into field devices from the target network via a provisioning network.

PRIOR ART DOCUMENTS

Non Patent Documents

[Non Patent Document 1]
"ISA-100.11a-2009 Wireless systems for industrial automation: Process control and related applications", p. 666-693, p. 306-310, p. 170-184.

DISCLOSURE OF INVENTION

Problems to be Solved by the Invention

In provisioning using a provisioning network that is a wireless subnetwork dedicated to provisioning as described above, the assumption is that communication is possible between the logically separated target network and the provisioning network. For this reason, a special router (hereinafter "provisioning-capable router") having the functionality necessary for provisioning by relaying between the target network and the provisioning network is required.

However, when using the above-noted provisioning-capable router, not only is the processing of the provisioning-capable router itself more complex than a normal router that performing relaying within a subnetwork, but the processing by a management apparatus that performs overall management of wireless communication resources provided in the wireless communication system also becomes complex. The first reason is that a provisioning-capable router that relays between different wireless subnetworks must perform transfer processing on a higher layer than a normal router, for example, on the network layer, which is higher than the datalink layer. The second reason is that a provisioning network, in contrast to a target network implemented as one continuous wireless subnetwork, is implemented in a distributed state across on a target network.

In this case, a method that can be envisioned is one that, rather than using the above-described provisioning network, connects wireless devices directly to the target network and performs provisioning. With this method, however, because a wireless device usually not permitted to join the target network must be caused to join the target network temporarily, there is a security-related problem, such as a risk that the key information used in encryption processing the communicated content on that target network may be compromised.

In a target network, an advertisement router providing information for connection of wireless devices that have been provisioned (hereinafter provisioned devices) to the target network as advertisement packets is provided. A wireless access point apparatus connected to a backbone network that serves as the core of the wireless communication system is a type of advertisement router, and a wireless access point apparatus also transmits a router advertisement as an advertisement packet in the same manner as an advertisement router. When an attempt is made to connect a wireless device requiring provisioning (hereinafter "provisioning-required device") to the target network, it can be thought that it is necessary to provide the advertisement router with the functionality required for provisioning. However, if advertisement routers having such functionality are mixed with advertisement routers that do not, it is necessary for a provisioning-required device to transmit a connection request with respect to not only an advertisement packet from the former type advertisement router, but also an advertisement packet from the latter type of advertisement router, and this can be thought of as risking a wasteful consumption of power.

The present invention provides a wireless communication apparatus and a wireless communication system that, without using a dedicated wireless subnetwork for provisioning, enables provisioning, while suppressing wasteful power consumption and maintaining security.

Means for Solving the Problems

A wireless communication apparatus, which wirelessly communicates with a wireless device via a wireless communication network, may include: a packet processor that generates a first packet including first control information and discrimination information for discriminating between the first control information for connecting an already-set wireless device in which necessary device information for joining to the wireless communication network has been set and a second control information for connecting a setting-required wireless device requiring setting of the device information, and a second packet including the discrimination information and the second control information; and a wireless communication unit that transmits the first packet and the second packet generated by the packet processor to the wireless communication network.

The wireless communication unit may transmit the first packet and the second packet to the wireless communication network as a router advertisement.

The wireless communication apparatus may further include: a storage unit that stores a first encryption key for encrypting the content communicated with the already-set wireless device connected to the wireless communication network and a second encryption key for encrypting the content communicated with the setting-required wireless device connected to the wireless communication network; and an encryption processor that encrypts the content communicated with the already-set wireless device connected to the wireless communication network using the first encryption key stored in the storage unit and that encrypts the content communicated with the setting-required wireless device connected to the wireless communication network using the second encryption key stored in the storage unit.

The wireless communication apparatus may further include: an encryption key selection unit that selects an encryption key for use in encryption processing by the encryption processor from among the first and second encryption keys stored in the storage unit based on a management table establishing a method of using the first and second encryption keys.

In the management table, the wireless communication resources allocated based on the first and second control information may be associated with information indicating an encryption key used for encrypting content communicated wirelessly with a wireless device using the wireless communication resources.

In the management table, discrimination information allocated uniquely to each wireless device may be associated with information indicating the encryption keys used for encrypting content communicated with the wireless devices.

In the management table, block information indicating the block of discrimination information allocable to a wireless device may be associated with information indicating an encryption key used for encrypting content communicated with a wireless device to which is allocated discrimination information included in the block indicated by the block information.

The packet processor may update the contents of the management table in accordance with the contents of a received packet.

The packet processor may add to the management table discrimination information of the already-set wireless device included in the packet and information indicating the first encryption key, in association with one another if the transmitting source of a received packet is the already-set wireless device, and add to the management table discrimination information of the setting-required wireless device included in the packet and information indicating the second encryption key, in association with one another, if the transmitting source of a received packet is the setting-required wireless device.

The first and second control information may identify a time slot and a communication channel of wireless communication by time division multiple access via the wireless communication network.

The discrimination information stored in a packet including the first information may indicate a message integrity symbol that assures integrity of the contents of the packet, and the discrimination information stored in a packet including the second information may indicate a special value that cannot be taken by the message integrity symbol.

A wireless communication system, in which wireless communication is performed via a wireless communication network, may include: a wireless communication apparatus that has a packet processor that generates a first packet including first control information and discrimination information for discriminating between the first control information for connecting an already-set wireless device in which necessary device information for joining to the wireless communication network has been set and a second control information for connecting a setting-required wireless device requiring setting of the device information, and a second packet including the discrimination information and the second control information; and a wireless communication unit that includes a router transmitting the first packet and the second packet generated by the packet processor to the wireless communication network as a router advertisement; and a wireless device that discriminates between the first and second control information based on the discrimination information included in the router advertisement transmitted from the wireless communication apparatus and, when the second control information is the discrimination result and the device information is not set, connects to the wireless communication network based on the second control information included in the router advertisement.

The wireless communication system may further include: a management apparatus that establishes the first and second control information to manage wireless communication via the wireless communication network, and sets the device information with respect to a wireless device connected to the wireless communication network based on the second control information.

A wireless communication method of wirelessly communicating with a wireless device via a wireless communication network may include: generating a first packet including a first control information and discrimination information for discriminating between the first control information for connecting an already-set wireless device in which necessary device information for joining to the wireless communication network has been set and a second control information for connecting a setting-required wireless device requiring setting of the device information, and a second packet including the discrimination information and the second control information; and transmitting the generated first packet and second packet to the wireless communication network.

The wireless communication method may further include: storing a first encryption key for encrypting the content communicated with the already-set wireless device connected to the wireless communication network and a second encryption key for encrypting the content communicated with the setting-required wireless device connected to the wireless communication network; encrypting the content communicated with the already-set wireless device connected to the wireless communication network using the stored first encryption key; and encrypting the content communicated with the setting-required wireless device connected to the wireless communication network using the stored second encryption key.

Effects of the Invention

The present invention transmits to a wireless communication network each of a first packet including first control information and discrimination information for connecting an already-set wireless device to a wireless communication network and a second packet including second control information and discrimination information for connecting a setting-required wireless device to the wireless communication network. Doing this enables provisioning while suppressing wasteful power consumption and maintaining security, without using a dedicated wireless provisioning subnetwork.

BRIEF DESCRIPTION OF THE DRAWINGS

FIG. 5 is a drawing for describing an encryption key management table used in the first embodiment of the present invention.

FIG. 6 is a drawing for describing an encryption key management table used in a second embodiment of the present invention.

PREFERRED EMBODIMENTS FOR CARRYING OUT THE INVENTION

A wireless communication apparatus and a wireless communication system according to embodiments of the present invention are described in detail below, with references made to the drawings.

First Embodiment

Figure 1:
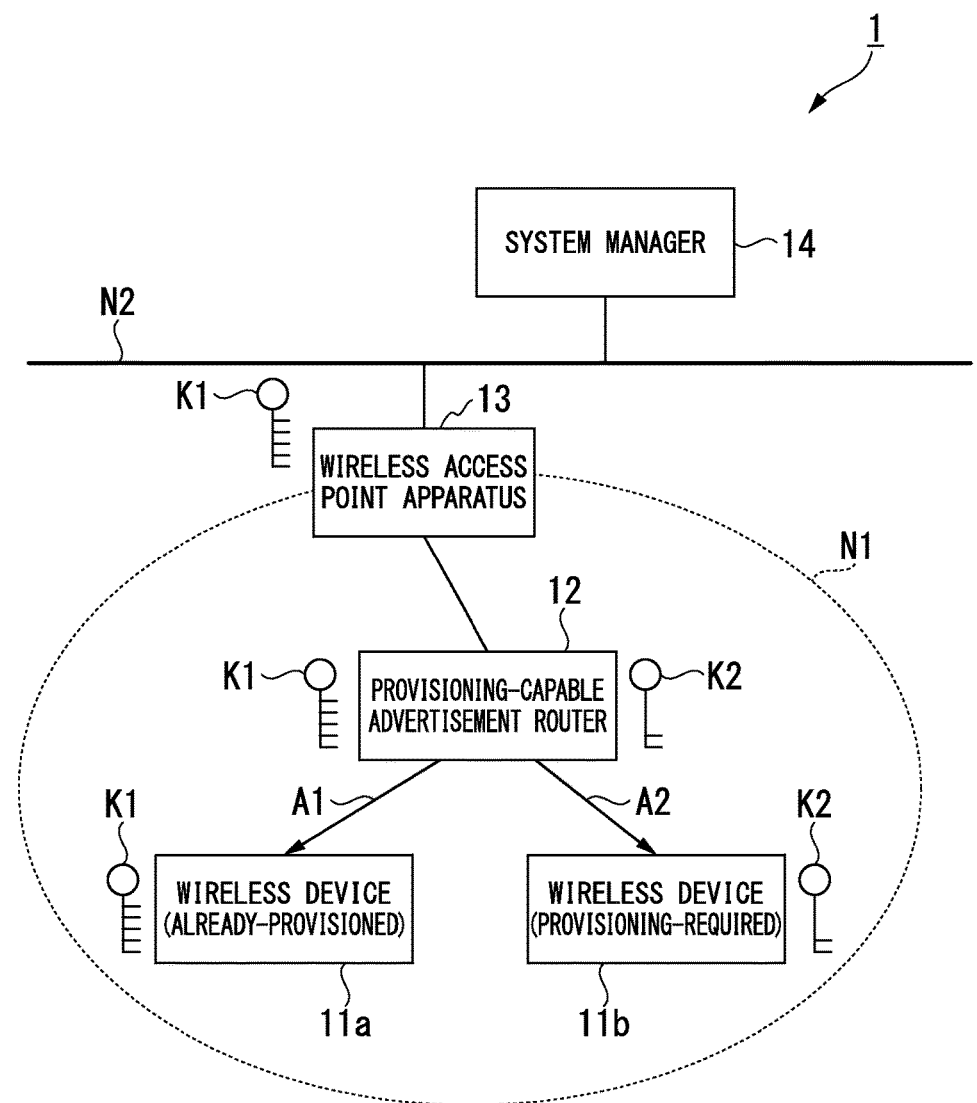
FIG. 1 is a block diagram showing the overall constitution of a wireless communication system according to a first embodiment of the present invention.

FIG. 1 is a block diagram showing the overall constitution of a wireless communication system according to the first embodiment of the present invention. As shown in FIG. 1, the wireless communication system 1 of the present embodiment has wireless devices 11a and 11b, a provisioning-capable advertisement router 12 (wireless communication apparatus), a wireless access point apparatus 13, and a system manager 14 (management apparatus), and is capable of wireless communication via a wireless communication network N1, under the management control of the system manager 14. Although only the two wireless devices 11a and 11b are shown in FIG. 1, the number of wireless devices is arbitrary.

Specifically, wireless communication system 1 is capable of wireless communication by TDMA (time division multiple access) using a plurality of communication channels conforming to ISA 100.11a, which is an industrial automation wireless communication standard. The number of communication channels is, for example, 16. This wireless communication is implemented by allocating wireless communication resources (time slots and communication channels) to the wireless devices 11a and 11b, the provisioning-capable advertisement router 12, and the wireless access point apparatus 13, with which the system manager 14 wirelessly communicates. In this manner, the system manager 14 establishes communication in real time, by allocating wireless communication resources all at one time.

The wireless communication network N1 in FIG. 1 is formed by the provisioning-capable advertisement router 12 and the wireless access point apparatus 13, under the management control of the system manager 14, and is a network to which wireless devices 11a and 11b should join. The backbone network N2 to which the wireless access point apparatus 13 and the system manager 14 are connected, is a cable network or other type of wireless network forming the core of the wireless communication system 1.

A wireless device 11 is, for example, a sensor device such as a flow gauge or temperature sensor, a valve device such as flow control value or open/close valve, an actuator device such as a fan or motor, or other wireless field device installed in a plant or factory, and is capable of wireless communication conforming to the above-noted ISA 100.11a wireless communication standard. To facilitate understanding, the wireless device 11a will be taken to be an already-provisioned device (already-set wireless device) in which device settings (provisioning) of device information necessary for connecting to the wireless communication network N1 have already been made, and the wireless device 11b will be taken to be a provisioning-required device (setting-required wireless device) that needs provisioning.

The provisioning-capable advertisement router 12 transmits different advertisement packets A1 and A2, respectively, to the wireless device 11a, which is an already-provisioned device, and to wireless device 11b, which is a provisioning-required device. Specifically, the advertisement packet A1 for the purpose of connecting to the wireless communication network N1 is sent to wireless device 11a, which is an already-provisioned device, to connect it to the wireless communication network N1. In contrast, the advertisement packet A2 for the purpose of connecting to the wireless communication network N1 for provisioning is sent to wireless device 11b, which is a provisioning-required device, for performing provisioning thereof.

The above-noted advertisement packet A1 is conventionally used for the purpose of causing a wireless device 11a, which is an already-provisioned device, to connect to the wireless communication network N1 or for the purpose of synchronizing the time of a wireless device that has joined the wireless communication network N1. In contrast, the above-noted advertisement packet A2 is a new advertisement packet for the purpose of implementing provisioning (OTA provisioning) of the wireless device 11b, which is a provisioning-required device, via the wireless communication network N1. The details of the provisioning-capable advertisement router 12 and the advertisement packets A1 and A2 will be described later.

The wireless access point apparatus 13 makes connection between the wireless communication network N1 to which the wireless devices 11a and 11b and the provisioning-capable advertisement router 12 are connected and the backbone network N2 to which the system manager 14 is connected, and relays various data transmitted and received between the wireless devices 11a and 11b and the like and the system manager 14. The wireless access point apparatus 13 is also a type of advertisement router, and communicates wirelessly in conformance with the above-described ISA 100.11a wireless communication standard.

The system manager 14 oversees the management control of the wireless communication network 1. Specifically, in order to implement wireless communication via the wireless communication network N1, the system manager 14 allocates wireless communication resources (time slots and communication channels) to the wireless devices 11a and 11b, the provisioning-capable advertisement router 12, and the wireless access point apparatus 13 that are connected to the wireless communication network N1.

The system manager 14 also manages and controls whether or not the wireless device 11a, which is an already-provisioned device, and the wireless device 11b, which is a provisioning-required device, are to be connected to the wireless communication network N1. Specifically, wireless communication resources (time slots and communication channels) are allocated to each of the wireless devices 11a and 11b for the purpose of connecting to the wireless communication network N1, and the advertisement packets A1 and A2 for the purpose of connecting to the wireless communication network N1 using the allocated wireless communication resources are each caused to be transmitted to the provisioning-capable advertisement router 12.

Additionally, if a joining request to the wireless communication network N1 (joining request) has been sent from the wireless device 11a, which is already-provisioned device connected, to the wireless communication network N1, the system manager 14 controls whether or not the wireless device 11a is to be caused to join the wireless communication network N1. Provisioning (OTA provisioning) of the wireless device 11b, which is a provisioning-required device connected to the wireless communication network N1, is done via the wireless communication network N1.

Additionally, in order to ensure security, the system manager 14 distributes an encryption key (shared key), for the purpose of encrypting communication content, to the wireless devices 11a and 11b, the provisioning-capable advertisement router 12, and the wireless access point apparatus 13 connected to the wireless communication network N1. Specifically, it distributes an encryption key K1 (first encryption key) to the wireless device 11a, the provisioning-capable advertisement router 12, and the wireless access point apparatus 13, that have been permitted to join the wireless communication network N1, and distributes an encryption key K2 (second encryption key) to the wireless device 11b and the provisioning-capable advertisement router 12 that are connected to wireless communication network N1.

In this case, the encryption key K1 is usually used to ensure security on the wireless communication network N1, and encryption key K2 is used only in provisioning. The reason the usual encryption key K1 and the encryption key K2 used only for provisioning are separated is to prevent the compromising of the usual encryption key K1 via a wireless device connected to the wireless communication network N1 for the purpose of provisioning.

Figure 2:
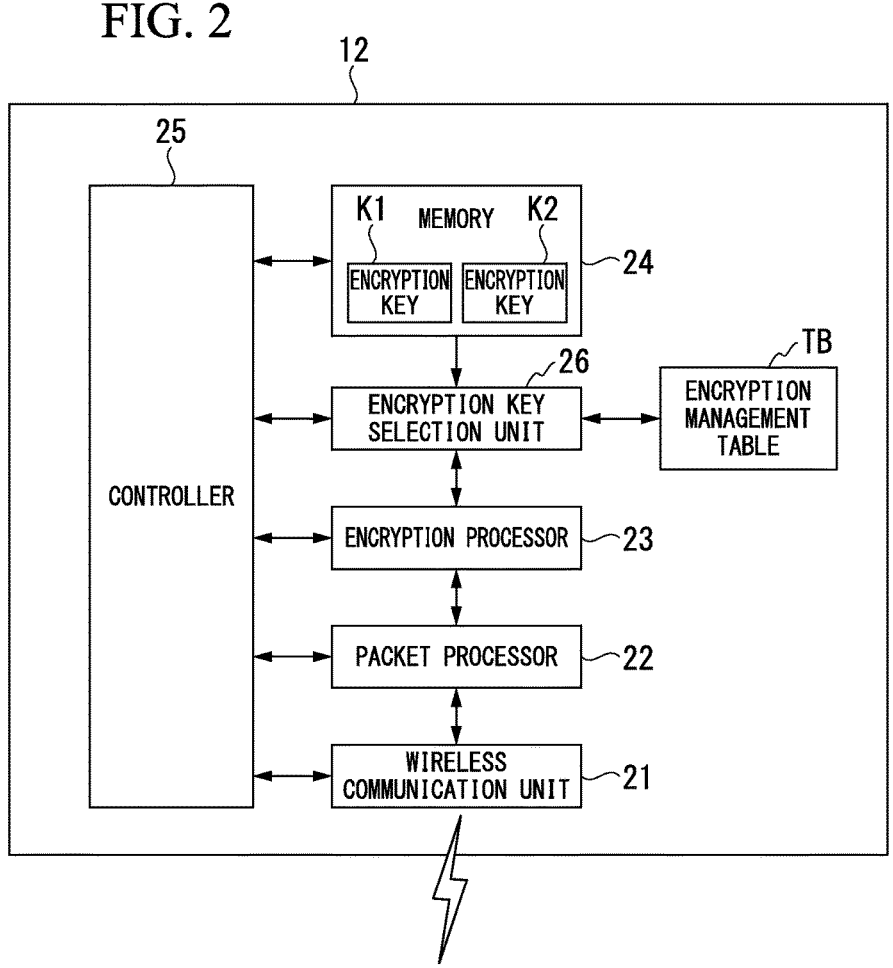
FIG. 2 is a block diagram showing the constitution of a provisioning-capable advertisement router as a wireless communication apparatus according to the first embodiment of the present invention.

Next, the details of the above-described provisioning-capable advertisement router 12 will be described. FIG. 2 is a block diagram showing the constitution of a provisioning-capable advertisement router as a wireless communication apparatus according to the first embodiment of the present invention. As shown in FIG. 2, the provisioning-capable advertisement router 12 has a wireless communication unit 21, a packet processor 22, an encryption processor 23, a memory 24 (storage unit), a controller 25, and an encryption key selection unit 26, and, for example, transmits advertisement packets A1 and A2 to the wireless devices 11a and 11b, under the control of the system manager 14.

The wireless communication unit 21, under the control of the controller 25, receives data (packets) transmitted via the wireless communication network N1 and transmits data (packets) to the wireless communication network N1. The packet processor 22, under the control of the controller 25, performs processing related to packets transmitted and received by the wireless communication unit 21. For example, in addition to extracting required data from packets received at the wireless communication unit 21, it generates packets (for example, packets transmitted as the advertisement packets A1 and A2) to be transmitted via the wireless communication unit 21.

Figure 3:
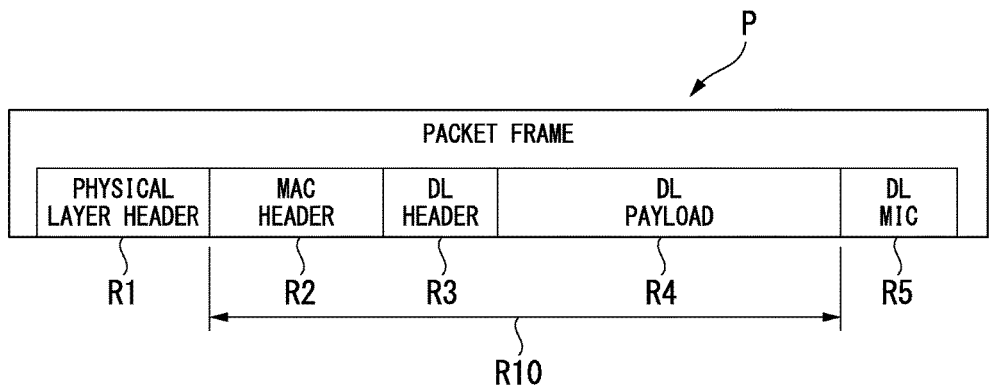
FIG. 3 is a drawing showing a packet generated by a provisioning-capable advertisement router as a wireless communication apparatus according to the first embodiment of the present invention.

FIG. 3 is a drawing showing a packet generated by a provisioning-capable advertisement router as a wireless communication apparatus according to the first embodiment of the present invention. As shown in FIG. 3, an advertisement packet P generated by a provisioning-capable advertisement router has three regions R1 to R3, in which various headers are stored, a region R4, in which a DL (datalink layer) payload is stored, and a region R5, in which a DL MIC (message integrity code), which is information ensuring the integrity of the packet contents is stored.

Specifically, a physical layer header is stored in the region R1, a MAC (media access control) header is stored in the region R2, and a DL header is stored in the region R3. Information indicating, for example, wireless communication resources (time slots and communication channels) allocated by the system manager 14 is stored in the region R4 as the DL payload. A DL MIC, which is information for the purpose of assuring the integrity of the contents of the assurance region R10, in which regions R2 to R4 are included, is stored in the region R5.

In the packet transmitted as the advertisement packet A1 from the provisioning-capable advertisement router 12, information (first control information) indicating the wireless communication resources (time slots and communication channels) allocated for an already-provisioned device (for example, the wireless device 11a) is stored in the region R4, and a DL MIC (discrimination information) in accordance with that information is stored in the region R5. That is, this is the same packet as conventionally used as an advertisement packet. The DL MIC stored in the region R5 is calculated using the encryption key K1 (the encryption key distributed from the system manager 14 to the provisioning-capable advertisement router 12 shown in FIG. 1).

In contrast, in the packet transmitted as the advertisement packet A2 from the provisioning-capable advertisement router 12, information (second control information) indicating the wireless communication resources (time slots and communication channels) allocated for a provisioning-required device (for example, the wireless device 11b) is stored in the region R4, and a special value (discrimination information) indicating that the wireless communication resources allocated for a provisioning-required device are stored in the region R4 is stored in the region R5. The special value stored in the region R5 can be, for example, the value of zero, which the above-noted DL MIC cannot take, or can be the result of a calculation of a dedicated public key that calculates a special DL MIC taking a value that cannot be taken by the above-noted DL MIC.

Therefore, by referencing the contents stored in the region R5 of the packet transmitted from the provisioning-capable advertisement router 12, it is possible to discriminate between the advertisement packet A1 for an already-provisioned device and the advertisement packet A2 for a provisioning-required device. For example, in the case in which the value stored in the region R5 of a packet transmitted from provisioning-capable advertisement router 12 is zero, or if there is coincidence thereof with the calculation result by a dedicated public key that calculates a special DL MIC, the packet is the advertisement packet A2 for a provisioning-required device, and in the case of other values, the packet is the advertisement packet A1 for an already-provisioned device.

The reason that the above-described discrimination of the DL MIC stored in the region R5 of the packet is to enable the above-noted discrimination while maintaining compatibility. As described above, although the DL MIC is information that ensures the integrity of the packet contents and is important in assuring the security of the wireless communication network N1, a problem does not occur if it is not used for the advertisement packet and the value thereof is changed. In contrast, if a new region for storing information for the above-noted discrimination is provided in the packet, a problem of compatibility arises. For this reason, using the DL MIC enables the above-noted discrimination, while maintaining compatibility.

Figure 4:
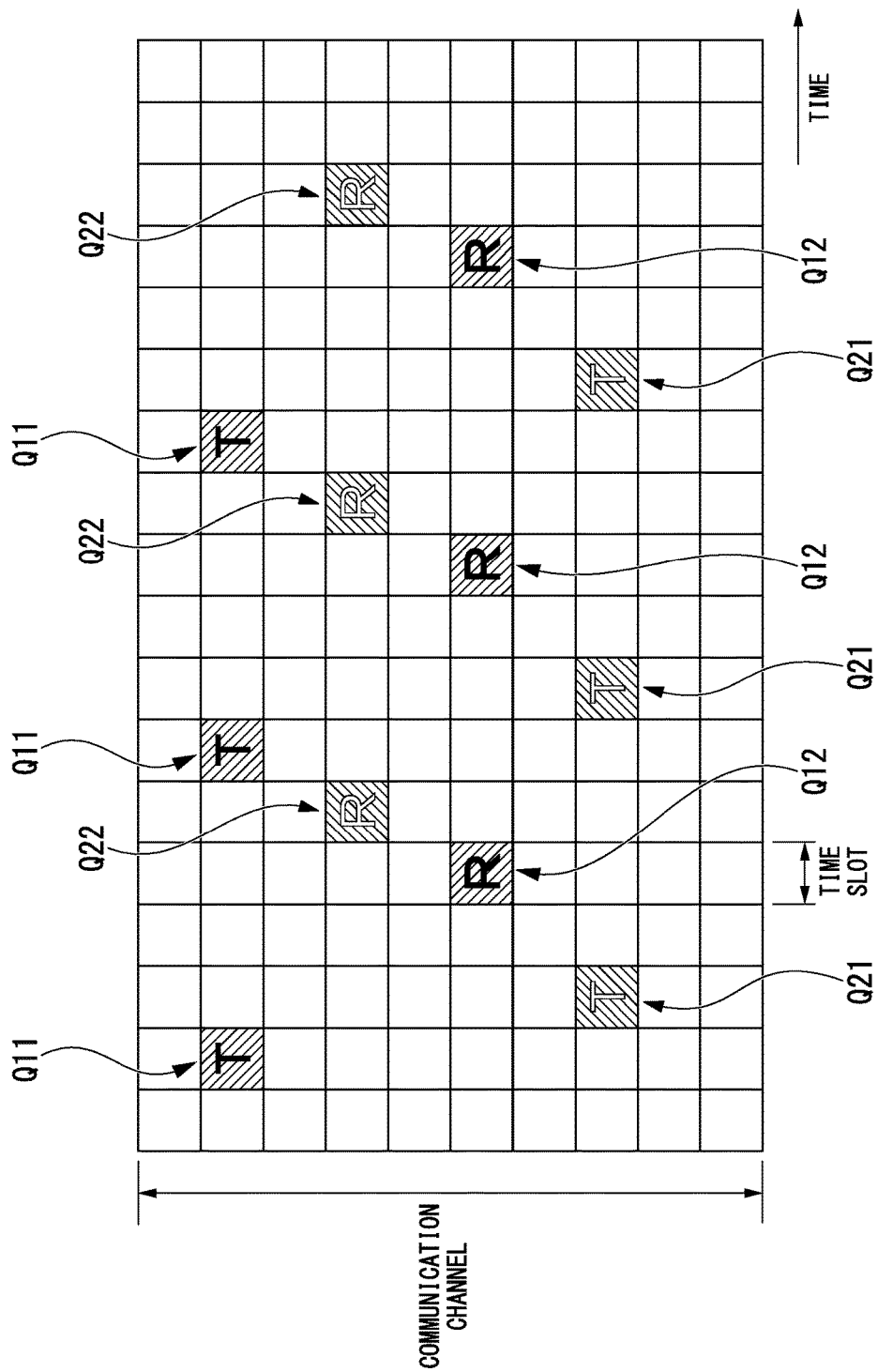
FIG. 4 is a drawing for describing the wireless communication resources allocated in the first embodiment of the present invention.

At this point, the wireless communication resources allocated by the system manager 14 will be described. FIG. 4 describes the wireless communication resources allocated in the first embodiment of the present invention, in which the horizontal axis represents time and the vertical axis represents the communication channels. In FIG. 4, one block in the horizontal-axis direction represents one time slot, and one block in the vertical-axis direction represents one communication channel. To simplify the illustration, only ten communication channels are shown in FIG. 4.

In FIG. 4, the block marked Q11 (a block with shading and a black letter T) indicates a wireless communication resource for transmitting that is allocated based on the advertisement packet A1, and the block marked Q12 (a block with shading and a black letter R) indicates a wireless communication resource for receiving allocated based on the advertisement packet A1. In contrast, the block marked Q21 (a block with shading and a white letter T) indicates a wireless communication resource for transmitting allocated based on the advertisement packet A2, and the block marked Q22 (a block with shading and a white letter R) indicates a wireless communication resource for receiving allocated based on the advertisement packet A2.

In the example shown in FIG. 4, the wireless communication resource allocated based on the advertisement packet A2 and the wireless communication resource allocated based on the advertisement packet A1 are allocated so that there is no mutual overlapping between the time slots and the communication channels thereof. In the present embodiment, wireless communication resources are allocated to the wireless device 11b to be provisioned, so as to prevent hindrance to communication by a wireless device that has joined the wireless communication network N1 or a wireless device 11a that is about to join the wireless communication network N1 as much as possible, while maintaining security.

After the wireless device 11a is connected to the wireless communication network N1 using wireless communication resources (marked Q11 and Q12 in FIG. 4) allocated based on the advertisement packet A1, the communication content between the wireless device 11a and the provisioning-capable advertisement router 12 is encrypted using the encryption key K1. In the same manner, after the wireless device 11b is connected to the wireless communication network N1 using wireless communication resources (marked Q21 and Q22 in FIG. 4) allocated based on the advertisement packet A2, the communication content between the wireless device 11b and the provisioning-capable advertisement router 12 is encrypted using the encryption key K2. In this manner, K1 and K2 are switched, based on the wireless communication resources allocated based on the advertisement packets A1 and A2.

Returning to FIG. 2, the encryption processor 23 uses the encryption key K1 stored in the memory 24 to generate and authenticate the DL MIC used in communication with the wireless device 11a that has joined the wireless communication network N1 (and communication with the wireless access point apparatus 13). It also uses the encryption key K2 stored in the memory 24 to generate and authenticate the DL MIC used in communication (communication other than the advertisement packet A2) with the wireless device 11b connected to the wireless communication network N1. Memory 24 is a non-volatile memory such as a RAM (random access memory), and stores the encryption keys K1, K2, and the like distributed from the system manager 14.

Controller 25 controls the overall operation of the provisioning-capable advertisement router 12. For example, if the encryption keys K1 and K2 have been distributed from the system manager 14, it controls so that these encryption keys K1 and K2 are stored in the memory 24. It also controls the wireless communication unit 21, the packet processor 22, and encryption processor 23, not only controlling the receiving and transmitting of data, but also controlling the transmitting of the advertisement packets A1 and A2.

The encryption key selection unit 26 selects the encryption key to be used in encryption processing by the encryption processor 23, from the encryption keys K1 and K2 stored in the memory 24 based on the encryption key management table TB (management table), thereby establishing the method of usage of the encryption keys K1 and K2. FIG. 5 is a drawing showing the encryption management table used in the first embodiment of the present invention. As shown in FIG. 5, the encryption key management table TB used in the present embodiment associates the wireless communication resources allocated based on the advertisement packets A1 and A2, with information indicating the encryption key for use in encrypting wireless communication content communicated with the wireless devices using each of the wireless communication resources.

Specifically, the encryption key K1 is associated with the wireless communication resources allocated based on the advertisement packet A1 (boxes marked Q11 and Q12 in FIG. 4), and the encryption key K2 is associated with the wireless communication resources allocated based on the advertisement packet A2 (boxes marked Q21 and Q22 in FIG. 4). Therefore, if wireless communication is done between the wireless device 11a and the provisioning-capable advertisement router 12 using the wireless communication resources allocated based on the advertisement packet A1 (boxes marked Q11 and Q12 in FIG. 4), the encryption key selection unit 26 selects the encryption key K1 as the encryption key used in encryption processing by the encryption processor 23. In contrast, if wireless communication is done between the wireless device 11b and the provisioning-capable advertisement router 12 using the wireless communication resources allocated based on the advertisement packet A2 (boxes marked Q21 and Q22 in FIG. 4), the encryption key selection unit 26 selects the encryption key K2 as the encryption key used in encryption processing by the encryption processor 23.

Next, the operation of the wireless communication system having the above-noted constitution will be described. In the following, both the wireless device 11a, which is an already-provisioned device, and the wireless device 11b, which is a provisioning-required device, are taken to be in a state of not being connected to the wireless communication network N1. In the state in which the wireless communication system 1 is operating, the allocation of wireless communication resources (time slots and communication channels) in the wireless communication network N1 is constantly done by the system manager 14.

Information indicating the wireless communication resources allocated by the system manager 14 is transmitted to each device (provisioning-capable advertisement router 12 and wireless access point apparatus 13) connected to the wireless communication network N1. When the wireless communication resources allocated for an already-provisioned device are transmitted to the provisioning-capable advertisement router 12, a packet in which information indicating these wireless communication resources and a DL MIC in accordance with that information are stored in the regions R4 and R5 shown in FIG. 3 is transmitted as the advertisement packet A1 generated by the packet processor 22 shown in FIG. 2.

In contrast, when the wireless communication resources allocated for a provisioning-required device are transmitted to the provisioning-capable advertisement router 12, a packet, in which information indicating these wireless communication resources is stored into the region R4 shown in FIG. 3, and a special value (for example, the value zero or the result of a calculation of a dedicated public key that calculates a special DL MIC) is stored in the region R5 shown in FIG. 3, is transmitted as the advertisement packet A2 generated by the packet processor 22 shown in FIG. 2. The above-noted special value indicates that information indicating wireless communication resources allocated for a provisioning-required device are stored in the region R4.

First, consider if the wireless device 11a, which is an already-provisioned device, is disposed at a position enabling it to receive the advertisement packets A1 and A2 transmitted from the provisioning-capable advertisement router 12. Upon receiving the advertisement packets A1 and A2 transmitted from the provisioning-capable advertisement router 12, the wireless device 11a references the region R5 of the packets that form the advertisement packets A1 and A2, discards the packet in which either the value zero or the calculation result by the dedicated public key that calculates the special DL MIC is stored (advertisement packet A2), and receives the packet in which a value other than the value zero or the calculation result by the dedicated public key that calculates the special DL MIC is stored (advertisement packet A1).

Next, the wireless device 11a uses information indicating the wireless communication resources stored in the region R4 (refer to FIG. 3) of the received packet (advertisement packet A1) and information set by provisioning beforehand, so as to connect to the wireless communication network N1 and transmit a join request to the provisioning-capable advertisement router 12. The join request transmitted to the provisioning-capable advertisement router 12 is transmitted to the system manager 14 via the wireless access point apparatus 13, and control is done of whether or not to cause the wireless device 11a to join the wireless communication network N1.

If joining the wireless communication network N1 is to be permitted, the system manager 14 establishes a communication path with the wireless device 11a and authenticates the wireless device 11a. If the authentication succeeds, the system manager 14 distributes the encryption key K1 to the wireless device 11a, thereby ending the processing for the wireless device 11a to join the wireless communication network N1.

After the wireless device 11a joins the wireless communication network N1, it uses the encryption key K1 distributed by the system manager 14 to encrypt communication content via the wireless communication network N1. When this is done, at the provisioning-capable advertisement router 12, the encryption key K1 is selected by the encryption key selection unit 26, based on the encryption key management table TB. The encryption processor 23 then encrypts the communication content using the encryption key K1. After the wireless device 11a joins the wireless communication network N1, the advertisement packet A1 transmitted periodically from the provisioning-capable advertisement router 12 is used to perform processing to synchronize the time of the wireless device 11a.

Next, consider the case in which the wireless device 11b, which is a provisioning-required device, is disposed at a position enabling it to receive the advertisement packets A1 and A2 transmitted from the provisioning-capable advertisement router 12. Upon receiving the advertisement packets A1 and A2 transmitted from the provisioning-capable advertisement router 12, the wireless device 11b first references the region R5 of the packets that form the advertisement packets A1 and A2, discards the packet in a value other than the value zero or the calculation result by the dedicated public key that calculates the special DL MIC is stored (advertisement packet A1) and receives the packet in which either the value zero or the calculation result by the dedicated public key that calculates the special DL MIC is stored (advertisement packet A2).

Next, the wireless device 11b uses information indicating the wireless communication resources stored in the region R4 (refer to FIG. 3) of the received packet (advertisement packet A2) to connect to the wireless communication network N1 and to communicate with the system manager 14 via the provisioning-capable advertisement router 12 and the wireless access point apparatus 13. When communication with the wireless device 11b is enabled, the system manager 14 distributes the encryption key K2 to wireless device 11b and then provisions (OTA provisioning) the wireless device 11b. Because the encryption key K2 is distributed to the wireless device 11b before provisioning, the content of the provisioning is also encrypted. When this is done, at the provisioning-capable advertisement router 12, the encryption key K2 is selected by the encryption key selection unit 26, based on the encryption key management table TB, and the encryption processor 23 encrypts the communication content using the encryption key K2.

As described above, in the present embodiment, a provisioning-capable advertisement router 12 is provided within the wireless communication network N1, with the advertisement packet A1 being transmitted to the wireless device 11a, which is an already-provisioned device, and the advertisement packet A2 being transmitted to the wireless device 11b, which is a provisioning-required device. In this case, the advertisement packet A1 is a packet in which information indicating wireless communication resources for the purpose of connecting the wireless device 11a, which is an already-provisioned device, to the wireless communication network N1 and the DL MIC are stored, and the advertisement packet A2 is a packet in which information indicating wireless communication resources for the purpose of connecting the wireless device 11b, which is a provisioning-required device, to the wireless communication network N1 and a special value (for example a value zero or the calculation result by the dedicated public key that calculates the special DL MIC) are stored.

Doing this enables use of time slots and communication channels that are different from the time slots and communication channels for the purpose of connecting to the wireless device 11a, which is an already-provisioned device, to the wireless communication network N1, so as to connect the wireless device 11b, which is a provisioning-required device, to the wireless communication network N1. As a result, it is possible to provision the wireless device 11b, which is a provisioning-required device, while maintaining security, without using a dedicated wireless subnetwork for provisioning. Also, because the wireless device 11b discards the advertisement packet A1 transmitted from the provisioning-capable advertisement router 12, receives only the advertisement packet A2, and makes a connection request only when the advertisement packet A2 is received, it is possible to suppress wasteful consumption of power.

Second Embodiment

Next, the second embodiment of the present invention will be described. In the first embodiment described above, the provisioning-capable advertisement router 12 switches between the encryption keys K1 and K2 as the basis for the wireless communication resources allocated based on the advertisement packets A1 and A2. In contrast, in the present embodiment the provisioning-capable advertisement router 12 switches between the encryption keys K1 and K2 based on the other party (wireless devices 11a and 11b) in the communication.

The wireless communication system of the present embodiment has the same constitution as the wireless communication system 1 shown in FIG. 1. The provisioning-capable advertisement router as the wireless communication apparatus in the present embodiment has substantially the same constitution as the provisioning-capable advertisement router shown in FIG. 2. However, the contents of the encryption key management table TB used by the provisioning-capable advertisement router in the present embodiment is different from that shown in FIG. 5.

FIG. 6 is a drawing showing the encryption key management table used in the second embodiment of the present invention. As shown in FIG. 6, the encryption key management table TB used in the present embodiment associates the EUI64 addresses as the identification information allocated uniquely to each wireless device, with information indicating the encryption keys for encrypting content communicated with the wireless devices.

In this case, the above-noted EUI64 addresses are 64-bit addresses allocated to each of the wireless device for the purpose of uniquely identifying the wireless devices.

For example, the EUI64 address of "XX:XX:XX:XX:XX:XX:XX:XX" is allocated to the wireless access point apparatus 13, and the EUI64 addresses of "YY:YY:YY:YY:YY:YY:YY:YY" and "ZZ:ZZ:ZZ:ZZ:ZZ:ZZ:ZZ:ZZ" are allocated, respectively to the wireless device 11a and the wireless device 11b. The above-noted X, Y, and Z are arbitrary hexadecimal values. In this case, the encryption key K1 is associated with the EUI64 address allocated to the wireless access point apparatus 13, and the encryption keys K1 and K2, respectively, are associated with the EUI64 addresses allocated to the wireless device 11a and the wireless device 11b.

If the encryption key selection unit 26 wirelessly communicates with the wireless device 11a or the wireless access point apparatus 13, it selects the encryption key K1 as the encryption key to be used in encryption by the encryption processor 23. In contrast, if encryption key selection unit 26 wirelessly communicates with the wireless device 11b, it selects the encryption key K2 as the encryption key to be used in encryption by the encryption processor 23. Although FIG. 6 shows an encryption key management table TB in which the EUI64 address and information indicating the encryption key are associated, if the other party in the communication can be identified, an address other than the EUI64 address (for example, a 16-bit DL address) may be used.

Next, the operation of the wireless communication system having the above-noted constitution will be described. The operation of the wireless system in the present embodiment is the same operation as in the wireless communication system 1 according to the embodiment 1, except for the operation of selecting the encryption keys K1 and K2 at the provisioning-capable advertisement router 12. For this reason, the following is a brief description of the operation when the provisioning-capable advertisement router 12 transmits and receives a packet with the wireless devices 11a and 11b that are joined to the wireless communication network N1.

(Operation when Transmitting a Packet)

When the operation of transmitting a packet starts, first, the packet processor 22 performs processing to generate a packet to be transmitted to the wireless devices 11a and 11b. When doing this, the encryption key selection unit 26 searches the encryption key management table TB shown in FIG. 6, based on information indicating the encryption key associated with the EUI64 address allocated to the other party in the communication (the wireless devices 11a, 11b), and selects the encryption key used in the encryption processing by the encryption processor 23 from among from the encryption keys K1 and K2 stored in the memory 24. Specifically, if the other party in the communication is the wireless device 11a, it selects the encryption key K1, and if the other party in the communication is the wireless device 11b, it selects the encryption key K2.

When the encryption key selection unit 26 selects the encryption key, the selected encryption key is passed to the encryption processer 23 to generate a DL MIC. The DL MIC generated by the encryption processer 23 is appended to the packet generated by the packet processer 22. Specifically, the DL MIC is stored in the region R5 of the packet P shown in FIG. 3. After the completion of this processing, the generated packet is transmitted to the other party in the communication (the wireless devices 11a and 11b) via the wireless communication network N1 from the wireless communication unit 21. By the above operation, the packet with the DL MIC appended thereto generated using the encryption key K1 is to be transmitted to the wireless device 11a, and the packet with the DL MIC appended thereto generated using the encryption key K2 is to be transmitted to the wireless device 11b.

(Operation when Receiving a Packet)

When a packet is transmitted to the provisioning-capable advertisement router 12 via the wireless communication network N1 from the other party in the communication (the wireless devices 11a and 11b), the packet is received by the wireless communication unit 21. Then, the encryption key selection unit 26 searches the encryption key management table TB shown in FIG. 6, based on information indicating the encryption key associated with the EUI64 address allocated to the other party in the communication (the wireless devices 11a, 11b), and selects the encryption key from among the encryption keys K1 and K2 stored in the memory 24. Specifically, if the other party in the communication is the wireless device 11a, it selects the encryption key K1, and if other party in the communication is the wireless device 11b, it selects the encryption key K2.

When the encryption key selection unit 26 selects the encryption key, the selected encryption key is passed to the encryption processer 23, a DL MIC is generated, and authentication is done regarding whether or not the generated DL MIC and the DL MIC included in the received packet (specifically, the DL MIC stored in the region R5 of the packet P shown in FIG. 3) coincide. Should authentication be made that the two DL MICs coincide, the packet processor 22 processes the received packet. By the above-noted operation, authentication of the packet transmitted from the wireless device 11a (the packet to which is appended the DL MIC generated using the encryption key K1) is performed using the encryption key K1 selected by the encryption key selection unit 26, and the authentication of the packet transmitted from the wireless device 11b (the packet to which is appended the DL MIC generated using the encryption key K2) is performed using the encryption key K2 selected by the encryption key selection unit 26.

As described above, in the present embodiment, although the point of difference is that the provisioning-capable advertisement router 12 switches between the encryption keys K1 and K2 using the other party in the communication (wireless devices 11a and 11b) as a basis, the present embodiment, in the same manner as the first embodiment, provides a provisioning-capable advertisement router 12 within the wireless communication network N1, so as to transmit the advertisement packet A1 to the wireless device 11a that is already provisioned and transmit the advertisement packet A2 to the wireless device 11b that requires provisioning. For this reason, similar to the first embodiment, the present embodiment can provision the wireless device 11b while maintaining security and also suppressing wasteful power consumption, without using a dedicated wireless subnetwork for provisioning.

Third Embodiment

Next, the third embodiment of the present invention will be described. In the above-described second embodiment, the provisioning-capable advertisement router 12 switched between the encryption keys K1 and K2 based on the other party in communication (wireless devices 11a and 11b), using the encryption key management table TB shown in FIG. 6. The present embodiment relates to a method of generation (modification) of the encryption key management table TB shown in FIG. 6. Methods of generating (modifying) the encryption key management table TB used by the provisioning-capable advertisement router 12 are the method performed by the system manager 14 that manages the wireless communication system and the method performed automatically by the provisioning-capable advertisement router 12. In the following, the latter method will be described.

The encryption key management table TB shown in FIG. 6, as described above, is a table in which of the EUI64 addresses allocated to each wireless device are associated with information indicating encryption keys. For this reason, the generation (modification) of the encryption key management table TB in the provisioning-capable advertisement router 12 is done at the timing of a join request from a wireless device attempting to join the wireless communication network N1.

In this case, in order for the provisioning-capable advertisement router 12 to generate the encryption key management table TB shown in FIG. 6 automatically, it is necessary to discriminate a wireless device that has transmitted a join request as being either the wireless device 11a that is already provisioned or the wireless device 11b that requires provisioning. To make that discrimination, the provisioning-capable advertisement router 12 uses an application-specific MIC included in the payload stored in the region R4 of the packet P1 shown in FIG. 7.

Figure 7:
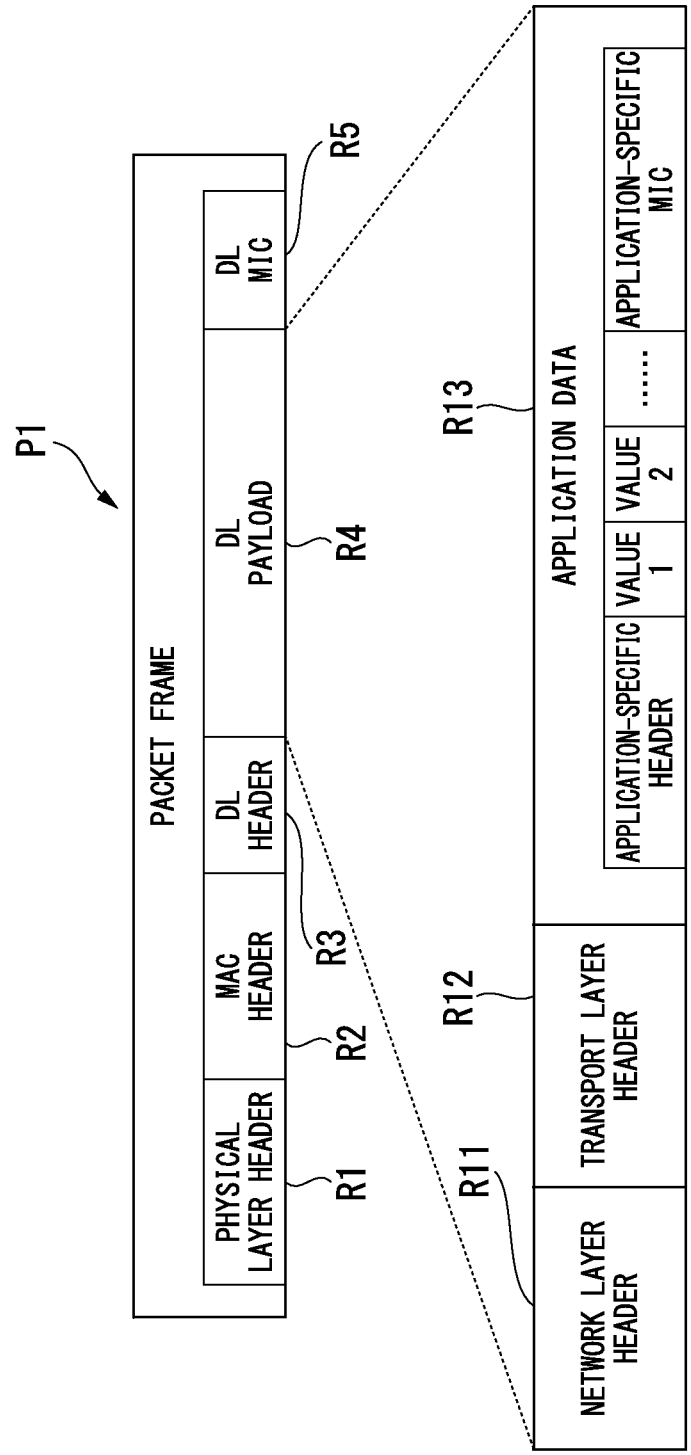
FIG. 7 is a drawing showing a packet used when requesting to join in a third embodiment of the present invention.

FIG. 7 shows a packet used at the time of a join request in the third embodiment of the present invention. As shown in FIG. 7, the packet P1 used in this embodiment, similar to the packet P shown in FIG. 3, has three regions R1 to R3, in which various headers are stored, a region R4, in which the DL payload is stored, and a region R5, in which a DL MIC is stored. In this case, the region R4 is provided with regions R11 and R12, into which the headers for the network layer and transport layer, respectively, are stored, and a region R13, into which application data is stored. The above-noted application-specific MIC is information that ensures the integrity of the contents of specific application data of the application data stored in the region R13, and is stored in the region R13 along with the application data.

The above-noted application-specific MIC is computed using a key used at the time the wireless devices 11a and 11b join. Specifically, for the wireless device 11a that is already provisioned, it is computed using a join key set by provisioning, and for the wireless device 11b that requires provisioning, it is computed using a (default) shared key established beforehand.

The join key set in the wireless device 11a is shared only between the wireless device 11a and the system manager 14, and cannot be acquired by the provisioning-capable advertisement router 12. In contrast, the default shared key used by the wireless device 11b can be acquired by the provisioning-capable advertisement router 12. For this reason, by discriminating whether or not the application-specific MIC was generated using the shared key, the provisioning-capable advertisement router 12 can discriminate whether a wireless device that has sent a join request is the wireless device 11a that is already provisioned or the wireless device 11b that requires provisioning.

Figure 8:
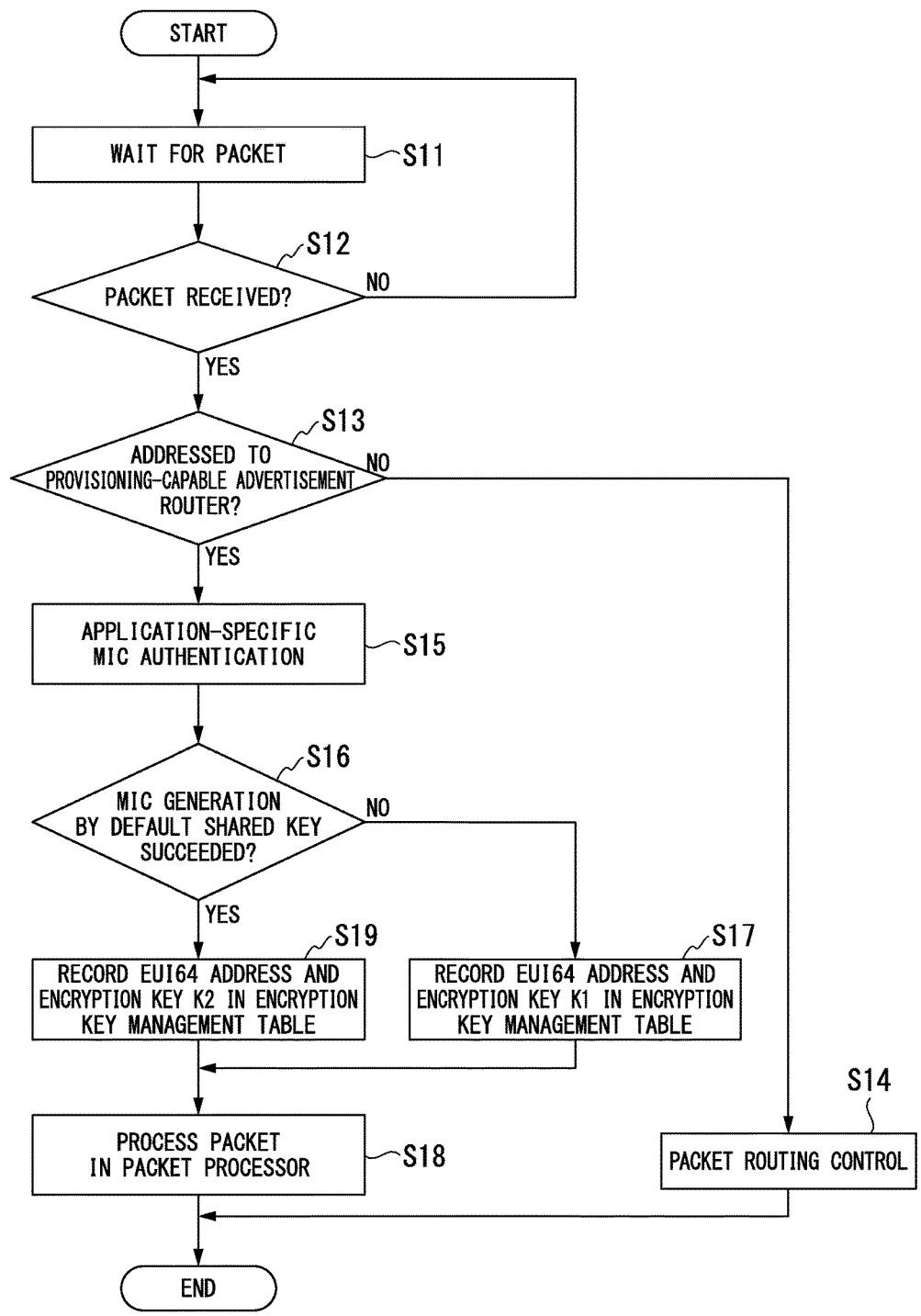
FIG. 8 is a flowchart showing the method of generating an encryption key management table in the third embodiment of the present invention.

FIG. 8 is a flowchart showing the method of generating an encryption key management table in the third embodiment of the present invention. The flowchart shown in FIG. 8 repeats from the start, for example, when the power to the provisioning-capable advertisement router 12 is switched on, until the end, when the processing of a received packet is completed. When the processing starts, at step S11, the provisioning-capable advertisement router 12 is in the state of waiting for a packet from the wireless devices 11a and 11b. At step S12, in this waiting state, the provisioning-capable advertisement router 12 judges whether or not a packet from the wireless devices 11*a* and 11*b* has been received by the wireless communication unit 21.

If the judgment is that a packet has not been received (judgment result of NO), the provisioning-capable advertisement router 12 returns to step S11 and continues in the state of waiting for a packet. In contrast, if the judgment is that a packet has been received (judgment result of YES), at step S13, the packet processor 22 of the provisioning-capable advertisement router 12 judges whether or not the received packet is addressed to itself (addressed to the provisioning-capable advertisement router 12).

Until the encryption keys K1 and K2 are distributed from the system manager 14, the wireless devices 11*a* and 11*b* that attempt to join the wireless communication network N1 communicate wirelessly via the wireless communication network N1 using the default shared key. For this reason, even if the EUI64 addresses of the wireless devices 11*a* and 11*b* have not been recorded in the encryption key management table TB, it is possible to authenticate the DL MIC stored in the region R5 of the packet P shown in FIG. 3.

If the judgment is that the received packet is not addressed to itself (judgment result of NO at step S13), at step S14, the provisioning-capable advertisement router 12 performs routing control for the received packet. That is, it performs processing to transfer the received packet to the next hop, in accordance with pre-established routing information. When the routing control is completed, the series of processing shown in FIG. 8 ends. If the series of processing shown in FIG. 8 ends, the processing of step S11 is done again.

In contrast, if the judgment is that the received packet is addressed to itself (judgment result of YES at step S13), at step S15, processing is performed by the packet processor 22 and encryption management unit 23 of the provisioning-capable advertisement router 12 to authenticate the application-specific MIC included in the received packet. Specifically, authentication is done as to whether the application-specific MIC stored in the region R13 of the packet P1 shown in FIG. 7 was generated using the default shared key (that is, whether it is possible to use the default shared key to generate the same MIC as the application-specific MIC stored in the region R13 of the packet P1 shown in FIG. 7).

More specifically, at step S15, the processing that actually generates the application-specific MIC is done by the encryption processor 23 using the default shared key, and the packet processor 22 performs processing to compare the application-specific MIC generated by the encryption processor 23 with the application-specific MIC that was stored in the region R13 of the packet P1 shown in FIG. 7. When the above-noted processing is completed, at step S16, the packet processor 22 judges whether or not the application-specific MIC was successfully generated by the default shared key (whether or not, using the default shared key, it was possible to generate an MIC the same as the application-specific MIC that was stored in the region R13 of the packet P1 shown in FIG. 7).

If the judgment is that the default shared key failed to generate the application-specific MIC (judgment result of NO at step S16), at step S17, the packet processor 22 records (adds) the EUI64 address included in the packet and the encryption key K1, in association with one another, into the encryption key management table TB, via the encryption key selection unit 26. In this case, the EUI64 address is associated with the encryption key K1 because it is predicted that the transmission source of the received packet is the wireless device 11*a*, which is an already-provisioned device, based on the failure to generate the application-specific MIC using the default shared key. When the above-noted processing is completed, at step S18, the packet processor 22 processes the received packet (specifically, performs proxy transmission processing to the system manager 14).

In contrast, if the judgment is that the default shared key succeeded in generating the application-specific MIC (judgment result of YES at step S16), at step S19, the packet processor 22 records (adds) to the encryption key management table TB the EUI64 address included in the packet and the encryption key K2, in association with one another, via the encryption key selection unit 26. In this case, the EUI64 address is associated with the encryption key K2 because it is predicted that the transmission source of the received packet is the wireless device 11*b*, which is a provisioning-required device, based on the success in generating the application-specific MIC using the default shared key. When the above-noted processing is completed, at step S18, the packet processor 22 processes the received packet (specifically, performs agent transfer processing to the system manager 14).

The above-noted encryption key K1 that is associated with the EUI64 address is (a) shown below, and the above-noted encryption key K2 that is associated with the EUI64 address is any one of (a) to (c) shown below.

(a) One obtained from the system manager 14 when the provisioning-capable advertisement router 12 itself joins the wireless communication network N1

(b) One distributed to the provisioning-capable advertisement router 12 as well when the system manager 14 distributes the encryption key K2 to the wireless device 11*b*

(c) One obtained when the provisioning-capable advertisement router 12 requests the system manager 14 to distribute the encryption key K2

When both the wireless devices 11*a* and 11*b* make join requests, by performing the above-noted processing, recording (addition) is done to the encryption key management table TB of the EUI64 address of the wireless device 11*a* in association with the encryption key K1 and the EUI64 address of the wireless device 11*b* in association with the encryption key K2. By doing this, the provisioning-capable advertisement router 12 switches between the encryption key used in communication with the wireless device 11*a* (encryption key K1) and the encryption key used in communication with the wireless device 11*b* (encryption key K2).

Fourth Embodiment

Next, the fourth embodiment of the present invention will be described. In the above-noted second embodiment, the provisioning-capable advertisement router 12 switches between the encryption keys K1 and K2 based on the other party in the communication (wireless devices 11*a* and 11*b*), using the encryption key management table TB shown in FIG. 6. In contrast, in the present embodiment, the provisioning-capable advertisement router 12 switches between the encryption keys K1 and K2 based on the block (address block information) of the discrimination information allocable to the other party in the communication (wireless devices 11*a* and 11*b*).

In the above-described second embodiment, because of the need to record information indicating an encryption key for the EUI64 address of each other party in the communication, the size of the encryption key management table TB shown in FIG. 6 increases in proportion to the increase in the number of wireless devices that join the wireless communication network N1. In the present embodiment, rather than recording information indicating encryption keys for each other party in the communication, information indicating encryption keys for each block (address block) of discrimination information allocable to other parties in the communication is recorded, thereby suppressing an increase in the size of the encryption key management table TB.

Figures 9, 10, 11:
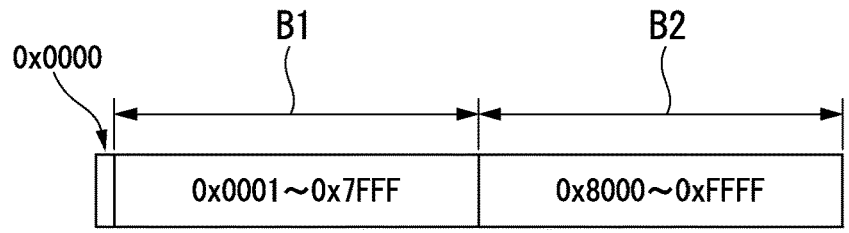
FIG. 9 is a drawing for describing the DL address used in a fourth embodiment of the present invention.
FIG. 10 is a drawing showing an encryption key management table used in the fourth embodiment of the present invention.
FIG. 11 is a drawing showing an encryption key management table used in a fifth embodiment of the present invention.

In the present embodiment, a 16-bit DL address, for example, is used in place of the EUI64 address as the above-noted discrimination information. FIG. 9 describes the DL address used in the fourth embodiment of the present invention. The DL address is distributed by the system manager 14 to a device that has joined the wireless communication network N1 and, as shown in FIG. 9, can take a value in the range of 0x0000 to 0xFFFF in hexadecimal notation. However, because the value 0x0000 is used to indicate that a DL address is not allocated, and values in the range from 0x8000 to 0xFFFF are reserved for future expansion, the actual range of values used for the DL address is from 0x0001 to 0x7FFF.

Given this, in the present embodiment, the 16-bit DL address is divided into an address block B1 in the range from 0x0001 to 0x7FFFF, used as the actual DL address, and an address block B2 in the range from 0x8000 to 0xFFFF, reserved for future expansion. An address included in the address block B1 is allocated to the wireless device 11a, which is already provisioned, and an address included in the address block B2 is allocated to the wireless device 11b, which requires provisioning.

FIG. 10 shows an encryption key management table used in the fourth embodiment of the present invention. As shown in FIG. 10, the encryption key management table TB used in the present embodiment has only two entries. The first entry associates the address block 131 with the range from 0x0001 to 0x7FFF with the encryption key K1, and the second entry associates the address block B2 with the range from 0x8000 to 0xFFFF with the encryption key K2. For this reason, even if the number of wireless devices joining the wireless communication network N1 increases, it is possible to suppress an increase in the size of the encryption key management table TB.

Fifth Embodiment

Next, the fifth embodiment of the present invention will be described. In the above-described first to fourth embodiments, the provisioning-capable advertisement router 12 used the encryption key K1 in operational wireless communication and used the encryption key K2 for wireless communication for the purpose of provisioning. In contrast, in the present embodiment, the provisioning-capable advertisement router 12 uses the default shared key (the encryption key K3) in place of the encryption key K2 for communication for provisioning.

FIG. 11 shows the encryption key management table used in the fifth embodiment of the present invention. As shown in FIG. 11, the encryption key management table TB used in the present embodiment replaces the encryption key K2 associated with the EUI64 address of "ZZ:ZZ:ZZ:ZZ:ZZ:ZZ:ZZ:ZZ" assigned to the wireless device 11b in the encryption key management table TB of FIG. 6 with the encryption key K3.

By using the encryption key management table TB shown in FIG. 11, when performing wireless communication (operational wireless communication) with the wireless device 11a or the wireless access point apparatus 13, the encryption key selection unit 26 selects the encryption key K1. In contrast, when performing wireless communication with the wireless device 11b (wireless communication for provisioning), the encryption key selection unit 26 selects the encryption key K3.

In this case, in the present embodiment, although the encryption key K1 is distributed from the system manager 14 to the wireless device 11a, the system manager 14 does not distribute the encryption key K3 to the wireless device 11b. Doing this simplifies the setting of the encryption key with respect to the wireless device 11b, and suppresses power consumption of the system manager 14 and the wireless device 11b by reducing the amount of communication. The present embodiment may be applied to the earlier-described first, third, and fourth embodiments. That is, the default shared key (the encryption key K3) may replace the encryption key K2 in the encryption key management tables TB shown in FIG. 5 and FIG. 10.

Although embodiments of the present invention have been described with regard to a wireless communication apparatus and a wireless communication system, the above-described embodiments to not restrict the present invention, which may be freely changed within the scope thereof. For example, although in the foregoing embodiments the description was for a wireless communication network 1 in which one wireless communication network N1 was formed, the present invention may be applied also to a wireless communication system in which a plurality of wireless communication networks (wireless subnetworks) are formed by a plurality of wireless access point apparatuses 13.

In the above-described embodiments, a special value (for example, the value of zero, which the DL MIC cannot take, or the result of a calculation of a dedicated public key that calculates a special DL MIC) is stored in the region R5 for the purpose of discriminating that information indicating a wireless resource stored in the region R4 of the packet shown in FIG. 3 is allocated for a provisioning-required device. However, a region in which the DL MIC is stored need not be used in the discrimination, and this may be appended to an advertisement packet as an explicit flag or the like.

In the above-described embodiments, although the descriptions have been of examples in which the provisioning-capable advertisement router 12, the wireless access point apparatus 13, and the system manager 14 are implemented as distinctly separate apparatuses, two or three of these may be implemented as one apparatus. For example, there are cases in which the provisioning-capable advertisement router 12 and the wireless access point apparatus 13 are implemented as one apparatus. Although in the above-noted embodiments the provisioning-capable advertisement router 12 is in the form of one that performs advertising, the wireless access point apparatus 13 may perform the above-noted type of advertising.

INDUSTRIAL APPLICABILITY

The present invention can be widely applied to wireless communication apparatuses and wireless communication systems, and can perform provisioning while suppressing wasteful power consumption and maintaining security, without using a dedicated wireless subnetwork for provisioning.

DESCRIPTION OF THE REFERENCE SYMBOLS

1 Wireless communication system
11a Wireless device (already-set wireless device)
11b Wireless device (setting-required wireless device)

12 Provisioning-capable advertisement router (wireless communication apparatus)
13 Wireless access point apparatus
14 System manager (management apparatus)
21 Wireless communication unit
22 Packet processor
23 Encryption processor
24 Memory (storage unit)
25 Controller
26 Encryption key selection unit
A1, A2 Advertisement packet
B1, B2 Address block (block information)
K1 Encryption key (first encryption key)
K2 Encryption key (second encryption key)
N1 Wireless communication network
N2 Backbone network
P1 Packet
Q11, Q12, Q21, Q22 block
R1 Physical layer header
R2 MAC (media access control) header
R3 DL (data link layer) header
R4 DL (data link layer) payload
R5 DL MIC (data link message integrity code)
R10 Assured region including R2 to R4
R11 Network layer header
R12 Transport layer header
R13 Application data
TB Encryption key management table

What is claimed is:

1. An industrial wireless communication apparatus that wirelessly communicates with a wireless device via an industrial wireless communication network of a communication standard of ISA 100.11a which is free of a provisioning-dedicated wireless network, the industrial wireless communication apparatus comprising:
  a packet processor configured to generate a first packet and a second packet, the first packet including a first control information and a first discrimination information, the second packet including a second control information and a second discrimination information,
  the first control information being used for connecting an already-provisioned wireless device to the industrial wireless communication network of the communication standard of ISA 100.11a, the already-provisioned wireless device having already been provisioned with a device information for joining to the industrial wireless communication network of the communication standard of ISA 100.11a,
  the second control information being used for connecting a provisioning-required wireless device to the industrial wireless communication network of the communication standard of ISA 100.11a for provisioning the provisioning-required wireless device with the device information for joining to the industrial wireless communication network of the communication standard of ISA 100.11a,
  the first discrimination information being used for the already-provisioned wireless device to join to the industrial wireless communication network of the communication standard of ISA 100.11a, and
  the second discrimination information being used for the provisioning-required wireless device to join to the industrial wireless communication network of the communication standard of ISA 100.11a for provisioning the provisioning-required wireless device,
  the second discrimination information including a special value which is not used in the first discrimination information for the industrial wireless communication network of the communication standard of ISA 100.11a; and
  a wireless communication unit configured to transmit the first packet generated by the packet processor and the second packet generated by the packet processor to the industrial wireless communication network of the communication standard of ISA 100.11a.

2. The wireless communication apparatus according to claim 1, wherein the wireless communication unit is configured to transmit the first packet and the second packet to the industrial wireless communication network including a router advertisement.

3. The wireless communication apparatus according to claim 1, further comprising:
  a storage unit that stores a first encryption key for encrypting the content communicated with the already-set already-provisioned wireless device connected to the industrial wireless communication network and a second encryption key for encrypting the content communicated with the setting-required provisioning-required wireless device connected to the industrial wireless communication network; and
  an encryption processor configured to encrypt the content communicated with the already-set already-provisioned wireless device connected to the industrial wireless communication network using the first encryption key stored in the storage unit and configured to encrypt the content communicated with the setting-required provisioning-required wireless device connected to the industrial wireless communication network using the second encryption key stored in the storage unit.

4. The wireless communication apparatus according to claim 3, further comprising:
  an encryption key selection unit configured to select an encryption key for use in encryption processing by the encryption processor from among the first and second encryption keys stored in the storage unit based on a management table establishing a method of using the first and second encryption keys.

5. The wireless communication apparatus according to claim 4, wherein in the management table, the industrial wireless communication resources allocated based on the first and second control information is associated with information indicating an encryption key used for encrypting content communicated wirelessly with a wireless device using the wireless communication resources.

6. The wireless communication apparatus according to claim 4, wherein in the management table, respective discrimination information allocated uniquely to each wireless device is associated with information indicating the encryption keys used for encrypting content communicated with the wireless devices.

7. The wireless communication apparatus according to claim 4, wherein in the management table, block information indicating that a block of discrimination information allocable to a wireless device is associated with information indicating an encryption key used for encrypting content communicated with a wireless device to which is allocated discrimination information included in the block indicated by the block information.

8. The wireless communication apparatus according to claim 4, wherein the packet processor is configured to update the contents of the management table in accordance with the contents of a received packet.

9. The wireless communication apparatus according to claim 4, wherein
the packet processor is configured:
to add to the management table discrimination information of the already-provisioned wireless device included in the packet and information indicating the first encryption key, in association with one another if the transmitting source of a received packet is the already-provisioned wireless device, and
to add to the management table the second discrimination information of the provisioning-required wireless device included in the packet and information indicating the second encryption key, in association with one another, if the transmitting source of a received packet is the provisioning-required wireless device.

10. The wireless communication apparatus according to claim 1, wherein the first and second control information identify a time slot and a communication channel of wireless communication by time division multiple access via the industrial wireless communication network.

11. The wireless communication apparatus according to claim 1, wherein the discrimination information stored in a packet including the first information indicates a message integrity symbol that assures integrity of the contents of the packet, and the discrimination information stored in a packet including the second information indicates a special value that cannot be taken by the message integrity symbol.

12. An industrial wireless communication method of wirelessly communicating with a wireless device via a wireless communication network of a communication standard of ISA 100.11a which is free of a provisioning-dedicated wireless network, the method comprising:
generating a first packet and a second packet, the first packet including a first control information and a first discrimination information, the second packet including a second control information and a second discrimination information,
the first control information being used for connecting an already-provisioned wireless device to the industrial wireless communication network of the communication standard of ISA 100.11a, the already-provisioned wireless device having already been provisioned with a device information for joining to the industrial wireless communication network of the communication standard of ISA 100.11a,
the second control information being used for connecting a provisioning-required wireless device to the industrial wireless communication network of the communication standard of ISA 100.11a for provisioning the provisioning-required wireless device with the device information for joining to the industrial wireless communication network of the communication standard of ISA 100.11a,
the first discrimination information being used for the already-provisioned wireless device to join to the industrial wireless communication network of the communication standard of ISA 100.11a, and
the second discrimination information being used for the provisioning-required wireless device to join to the industrial wireless communication network of the communication standard of ISA 100.11a for provisioning the provisioning-required wireless device,
the second discrimination information including a special value which is not used in the first discrimination information for the industrial wireless communication network of the communication standard of ISA 100.11a; and
transmitting the first packet generated by the packet processor and the second packet generated by the packet processor via the industrial wireless communication network of the communication standard of ISA 100.11a.

13. The wireless communication method according to claim 12, further comprising:
storing a first encryption key for encrypting the content communicated with the already-set already-provisioned wireless device connected to the industrial wireless communication network and a second encryption key for encrypting the content communicated with the setting-required wireless device connected to the industrial wireless communication network;
encrypting the content communicated with the already-set already-provisioned wireless device connected to the industrial wireless communication network using the stored first encryption key; and
encrypting the content communicated with the setting-required provisioning-required wireless device connected to the industrial wireless communication network using the stored second encryption key.

14. An industrial wireless communication apparatus that wirelessly communicates with a wireless device via an industrial wireless communication network as a control target, the industrial wireless communication network being free of a provisioning-dedicated wireless network, the industrial wireless communication apparatus comprising:
a packet processor configured to generate a first packet and a second packet, the first packet including a first control information and a first discrimination information, the second packet including a second control information and a second discrimination information,
the first control information being used for connecting an already-provisioned wireless device to the industrial wireless communication network, the already-provisioned wireless device having already been provisioned with a device information for joining to the industrial wireless communication network,
the second control information being used for connecting a provisioning-required wireless device to the industrial wireless communication network for provisioning the provisioning-required wireless device with the device information for joining to the industrial wireless communication network,
the first discrimination information being used for the already-provisioned wireless device to join to the industrial wireless communication network, and
the second discrimination information being used for the provisioning-required wireless device to join to the industrial wireless communication network for provisioning the provisioning-required wireless device,
the second discrimination information including a special value which is not used in the first discrimination information for the industrial wireless communication network; and
a wireless communication unit configured to transmit the first packet generated by the packet processor and the second packet generated by the packet processor to the industrial wireless communication network.

15. An industrial wireless communication method for wirelessly communicating with a wireless device via an industrial wireless communication network as a control target, the industrial wireless communication network being free of a provisioning-dedicated wireless network, the industrial wireless communication method comprising:

generating a first packet and a second packet, the first packet including a first control information and a first discrimination information, the second packet including a second control information and a second discrimination information, the first control information being used for connecting an already-provisioned wireless device to the industrial wireless communication network, the already-provisioned wireless device having already been provisioned with a device information for joining to the industrial wireless communication network, the second control information being used for connecting a provisioning-required wireless device to the industrial wireless communication network for provisioning the provisioning-required wireless device with the device information for joining to the industrial wireless communication network, the first discrimination information being used for the already-provisioned wireless device to join to the industrial wireless communication network, and the second discrimination information being used for the provisioning-required wireless device to join to the industrial wireless communication network for provisioning the provisioning-required wireless device, the second discrimination information including a special value which is not used in the first discrimination information for the industrial wireless communication network; and transmitting the first packet generated by the packet processor and the second packet generated by the packet processor to the industrial wireless communication network.

* * * * *